United States Patent [19]

Callaghan et al.

[11] Patent Number: 4,533,250
[45] Date of Patent: Aug. 6, 1985

[54] READOUT APPARATUS FOR A RING LASER ANGULAR RATE SENSOR

[75] Inventors: Timothy J. Callaghan, Minneapolis, Minn.; Robert M. Kay, Seminole, Fla.

[73] Assignee: Honeywell Inc., Minneapolis, Minn.

[21] Appl. No.: 484,108

[22] Filed: Apr. 11, 1983

[51] Int. Cl.³ .............................................. G01C 19/64
[52] U.S. Cl. .................................................... 356/350
[58] Field of Search ....................... 356/345, 349, 350; 350/94; 324/77 A, 83 D

[56] References Cited

U.S. PATENT DOCUMENTS 4,152,072  5/1979  Hutchings .......................... 356/350
4,219,276  8/1980  Dorsman ............................ 356/350
4,280,766  7/1981  Goss et al. ......................... 356/350

Primary Examiner—Vincent P. McGraw
Assistant Examiner—S. A. Turner
Attorney, Agent, or Firm—Robert A. Pajak

[57] ABSTRACT

In the present invention, a detector responsive to an interference pattern produces pulses which relate to the fringe change of the pattern. The pulses are timed by a running clock. The pulse times are fed to an interpolating means such as a computer for interpolating fringe change between the last pulse and a measurement command signal. The detector of the present invention is specifically applicable to ring laser angular rate sensor systems.

16 Claims, 4 Drawing Figures

READOUT APPARATUS FOR A RING LASER ANGULAR RATE SENSOR

The Government has rights in this invention pursuant to Contract No. F04701-76-C-0135, awarded by Department of the Air Force.

The present invention relates to a readout for a ring laser angular rate sensor in which the beat frequency between the counterpropagating waves is directly related to the rotation of the sensor.

BACKGROUND OF THE INVENTION

Ring laser sensors are well known in the art and some examples are specifically described in U.S. Pat. Nos. 3,627,425, 3,373,650, and 3,390,606 which are assigned to the same assignee as the present application. Sensors such as these employ counterpropagating laser beams traveling about a closed-loop path. The frequency difference between the counterpropagating laser beams is directly related to the rotation of the sensor. The sensor commonly employs an optical system for projecting a portion of each of the counterpropagating laser beams at a slight angle with each other so as to create an interference fringe pattern which is projected on a light responsive device such as a photodetector for monitoring the intensity variation of the interference fringe pattern.

Detectors of the prior art employ at least one photodetector at a fixed spatial position relative to the interference fringe pattern for providing an output signal indicative of the intensity of that portion of the interference fringe pattern projected thereon. The output of the photodetector is subsequently amplified and passed through a circuit means, for removing any DC component, and presented to one input of a comparator. The other end of the comparator, is normally connected to a reference potential near ground. The output of the comparator provides a square wave with positive going and negative going edges coincident with positive going and negative going zero crossings of the comparator signal input. The comparator output is connected to a positive edge detector and a negative edge detector which converts the comparator output into a series of corresponding pulses. In such a system as just described, the interval between two consecutive pulses represent an interference fringe change of one-half of the fringe spacing of the projected interference fringe pattern.

In the art of ring laser gyros, one-half of a fringe spacing change corresponds to a $\pi$ radian phase change between the counterpropagating laser beams. The total value of fringe change from some reference point in time corresponds to a specific angle of rotation of the sensor dependent upon the sensor's scale factor which is a function of the sensor's closed-loop path. Thus, counting of the number of pulses or fringe changes provides a system for obtaining angular rotation of the sensor. A detector system as just described is shown, at least in part, in U.S. Pat. No. 3,627,425.

For precision navigational systems, improved resolution greater than one-half a fringe spacing is desired. This may be obtained by providing a plurality of detectors responsive to the same interference pattern at different points in between a complete fringe spacing. For example, if two detectors are provided which are separated by one-quarter of a fringe spacing, appropriate circuitry can obtain a series of pulses representative of a change of one-quarter of a fringe. Nevertheless, in precision navigational systems, it is desirable to obtain an angular rotation measurement upon a request of a measurement command signal. Of course, this signal does not occur coincident with a detector output pulse, therefore, interpolation is required for enhanced accuracy.

It is the object of the present invention to provide an apparatus for measuring fringe changes of a varying interference fringe pattern upon a measurement command signal with substantially enhanced resolution and in which does not require a large number of detectors.

BRIEF DESCRIPTION OF THE PRESENT INVENTION

In the present invention, a detector responsive to an interference pattern produces pulses which relate to the fringe change of the pattern. The pulses are timed by a running clock. The pulse times are fed to an interpolating means such as a computer for interpolating fringe change between the last pulse and a measurement command signal.

DETAILED DESCRIPTION OF THE INVENTION

Figure 1:
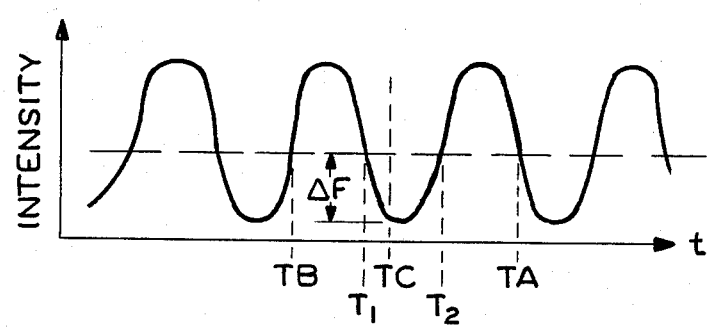
FIG. 1 is a graphical representation of an output of a photodetector responsive to a varying interference fringe pattern.
Figure 2:
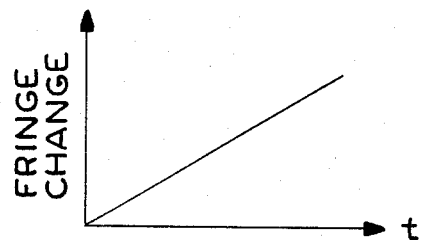
FIG. 2 is a graphical representation of increasing fringe change with a monotonically varying interference pattern.

Shown in FIG. 1 is a graphical representation of a varying interference fringe pattern intensity as observed by a photodetector in fixed spatial relationship to the interference pattern projected thereon. FIG. 1 is exemplary of a photodetector output commonly employed in a ring laser angular rate sensor system. A varying or moving interference pattern occurs when a ring laser angular rate sensor is rotating at some rate. This results in the interference pattern to vary in intensity as seen by the photodetector. The rate of change of the interference fringe change is directly related to the rotation rate of the sensor and the number of fringe changes is a measurement of the rotation angle as is well known in the art. For a constant rate of rotation, the number of fringe changes may be graphically represented as shown in FIG. 2 in which fringe change vs. time is linear. It should be noted that the interference fringe pattern may be considered to be a spot pattern which is created by two coexisting waves that cause the intensity of the spot to vary, or a fringe pattern consisting of a few fringers which is created by two waves which are at a slight angle with each other. The present invention is not restricted to the above two types of patterns which are commonly found in ring laser angular rate sensors and other applications.

Figure 3:
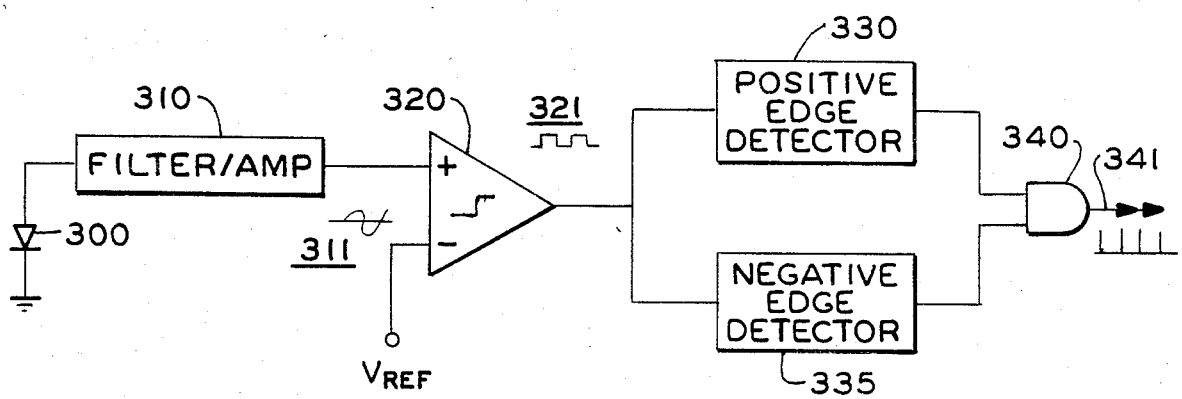
FIG. 3 is a block diagram of a detector means for providing discrete signals upon discrete changes in an interference fringe pattern.

Shown in FIG. 3 is a detector means for providing a selected signal such as a pulse for indicating ½ of a fringe change of a varying interference fringe pattern. A photodetector 300 is positioned to be responsive to a varying interference fringe pattern having an output similar to that shown in FIG. 1. The output of photodetector 300 is amplified and its DC component filtered out in filter/amplifier 310. The output of filter/amplifier 310 is a sinusoidal signal, indicated by numeral 311, having an average DC value of zero. The output of filter/amplifier 310 is presented to a positive input of comparator 320 having its negative input at some reference potential such as ground. The output of comparator 320 is essentially a square wave signal, indicated by numeral 321 wherein each cycle represents a passing of one complete fringe observed by photodetector 300, and each half a cycle represents one-half of a fringe change. The output of comparator 320 is presented by positive edge detector 330 and negative edge detector 335. The output of positive edge detector 330 is a positive pulse upon each rising edge of the square wave output of comparator 320, and the output of negative edge detector 335 is a positive pulse upon each negative change of the output of comparator 320. The outputs of positive edge detector 330 and 335 are presented as inputs to an OR gate 340 having an output signal indicated by signal line 341.

The operation of the detector means shown in FIG. 3 is such that the separation between two pulses represents the changing of one-half of a fringe change. The rate of change of the fringe change may be determined by knowing the intersignal time between two consecutive pulses.

The detector means as thus far presented and shown in FIG. 3 is well known in the art. The output signal line 341 is normally presented to a counter for counting the number of pulses. Each count represents one-half of a fringe change. In ring laser angular rate sensors, each one-half of a fringe change represents a $\pi$ radian phase change between the sensor's counterpropagating waves from which an angular rotation can be determined by knowing the sensor scale factor.

It should be noted that ring laser angular rate sensors usually employ one of two types of biasing schemes for maintaining the sensor above a threshold value known as the lock-in rate. One scheme employs mechanical oscillations of the sensor, back and forth, and a second scheme employs a constant rate bias or constant rate rotation of the sensor. In the former oscillating technique, a second photodetector is normally employed in the detector system shown in FIG. 3 in combination with photodetector 300 so as to provide direction indication. The system then typically uses a pulse counting scheme of UP and DOWN counts for determining net angular rotation due to some inertial input. On the other hand, the latter technique does not require periodic UP and DOWN counting since the system is always rotating in one direction. However, a means must be provided to subtract the constant rate bias in order to determine the net inertial input rate.

Note that two photodetectors appropriately separated may provide output pulses or counts such that the intersignal time (interpulse time) represents a change of one-quarter of a fringe change which, of course, improves resolution. If the two photodetectors are separated by about $\frac{1}{4}$ of a fringe spacing, two consecutive output pulses represent a phase difference change of $\pi/2$ radians between the counterpropagating waves of the sensor. It should be further noted that each of the above mechanical biasing techniques has an electrical-optical counterpart providing essentially the same intended function and affecting the output interference fringe pattern in essentially the same manner.

In the present invention, the detector means need only provide a selected signal, e.g. a pulse, for each occurrence of a selected fringe change of a varying or changing interference pattern. If one detector is used, that selected fringe change may be one-half of a fringe change. On the other hand, if two photodetectors are used, such as in a mechanically rotated bias system, the selected fringe change may be $\frac{1}{4}$ of a fringe change.

Figure 4:
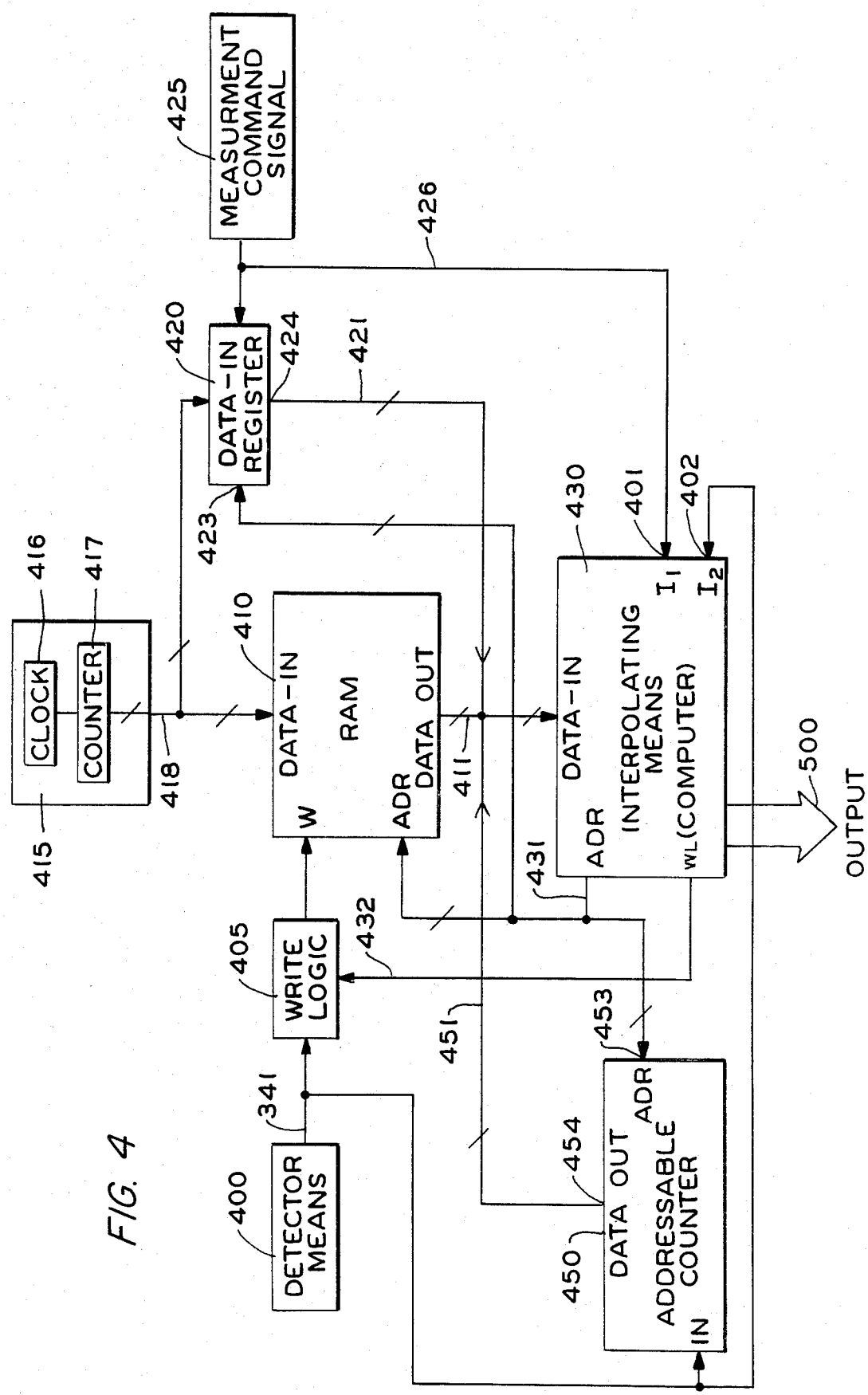
FIG. 4 is a schematic block diagram of one embodiment of the invention of the present application.

A block diagram of one embodiment of the present invention is illustrated in FIG. 4. The detector means shown in FIG. 3 is indicated in FIG. 4 by numeral 400 having output signal 341. Hereafter, the output of detector 400 will be referred to as fringe change pulses. Fringe change pulses are presented to a "write" input, "W", of a random access memory (RAM) 410 through a "write" logic block 405 controlled by computer 430 as will be explained in more detail later. A measurement command signal on signal line 426 is provided by block 425 which is an external request signal initiating an interpolation of fringe change between the last pulse preceding the measurement command signal and the measurement command signal. Hereafter, the elapsed time between the last preceding fringe change pulse and the command signal is referred to as the interpolation time, and the fringe change occurring therebetween is referred to as the interpolated fringe change.

The system shown in FIG. 4 consists essentially of a combination of a timing means for determining and storing pulse times of the detector 400 and an interpolation means for using the pulse times and interpolating the fringe change. The timing means includes a continuously running clock and a memory device such as a RAM. The interpolation means may be any type of device which can provide the interpolation function, such a device being practically known as a computer or the like. In FIG. 4 is a clock means 415 comprising a high frequency clock 416 and a counter 417 providing sixteen bits of information on signal line 418. Such a clock means is well known in the art and provides a time output signal on signal line 418 representative of clock times of a continuously running clock. The output of clock means 415 is presented to the data input of RAM 410 and the input of storage register 420. The data output of RAM 410 indicated by numeral 411 and the data output of register 420 indicated by signal line 421 each has sixteen bits of information which are presented to a Data-Input of computer 430 which may be by way of example a microprocessor. Computer 430 provides (i) address data on signal line 431 to the address input, ADR, of RAM 410; (ii) read/write control signals on signal line 432 presented to control logic 405; and (iii) data flow control signals (not shown). Computer 430 also processes selected data stored in RAM 410 to provide the interpolation function for determining the interpolated fringe change during the interpolation time providing that the command signal is not coincident with the fringe change pulse. In the latter case, no interpolation is required. Computer 430 includes a first interrupt input terminal 401 which is responsive to the measurement command signal on signal line 426, and a second interrupt terminal 402 which is responsive to an output pulse on line 341.

Further shown in FIG. 4 is an addressible counter 450 responsive to the output of detector 400 through signal line 341. Counter 450 provides an output signal line 451 presented to Data-Input of computer 430 for providing count information to computer 430. Counter 450 counts the number of pulses provided by detector means 400 in a manner well known in the art, and provides an indication of discrete fringe changes of the interference pattern.

Addressible counter 450 includes an addressible control input 453 which is connected to ADR signal line 431 from computer 430. The counter's Data Output 454 on signal line 451 is connected to the DATA-IN input of computer 430. Similarly, register 420 includes an addressible control input 423 which is also connected to ADR signal line 431. The register's Data Output 424 on signal line 421 is also connected to the DATA-IN input of computer 430. Thus, as shown in FIG. 4, the DATA-IN input of computer is connected to the Data Outputs of counter 450, RAM 410, and register 420. Also, the ADR signal line 431 output of computer 430 is connected to the ADR input of RAM 410, and also addressible control input 453 of counter 450 and addressible control input 423 of register 420. Signal lines 431 and DATA INPUT/OUTPUT lines 411, 421, and 451 are a plurality of lines, for example 16, as is well known in the art of digital data systems. Therefore, under control of computer 430, the computer 430 can read the contents of counter 450—number of fringe changes, the contents of register 420—the measurement command signal time, and the contents of RAM 410—signal line 431 pulse times. This data read by computer 430 can then be processed as will be further described.

The fringe counting system shown in FIG. 4 will now be described. RAM 410 in combination with computer 430 provides a means for determining intersignal times between occurrences of fringe change pulses provided by detector means 400. Each of these intersignal times represents one-half of a fringe change. As will be more particularly described below, a combination of RAM 410, register 420 and computer 430 provides a means for determining the elapsed time between the immediately preceding pulse prior to the measurement command signal, i.e. the interpolation time. This is accomplished by calculating time differences between times associated with occurrences of fringe change pulses. Hereafter, they are referred to as intersignal times. The arrangement of RAM 410 and computer 430 is such that clock times of clock means 415 is processed to provide the intersignal times.

In the present application, computer 430 processes the interpolation time calculated and selected ones of the intersignal times for providing an output signal representative of the interpolated fringe change during the interpolation time. This interpolation function may be accomplished by several techniques as will subsequently be illustrated with reference to FIG. 1.

The elongated dashed line in FIG. 1 represents the average value of the intensity signal of the output of photodetector 300 provided by filter-amplifier 310. A measurement command signal is indicated by time TC. Detector means 400 provides output pulses at TB, T1, T2, and TA. The interpolation time is TC−T1, and the interpolated fringe change will be indicated by ΔF.

A first interpolation technique for finding the interpolated fringe change is provided by computing the ratio of the interpolation time and the intersignal time T2−T1, mathematically described by:

$$\Delta F = \frac{TC - T1}{T2 - T1}$$

ΔF represents the fraction of one-half of a fringe change or whatever selected signal change is indicated by the occurrence of two successive pulses from detector means 400. Thus, the resolution is highly improved over the prior art since ΔF may be any fraction of one-half of a fringe.

A second time interpolation technique is similar to the one above, but includes determining the intersignal times before and after the measurement command signal as well as the intersignal time about the measurement command signal. Referring to FIG. 1, these intersignal times include T1−TB, T2−T1, and TA−T2. The average value of these intersignal times may be computed assuming a substantially constant intersignal time. This is the situation where the interference fringe is varying at a substantially constant rate as in constant rate biased angular rate sensors. Thus, the ratio of the interpolation time and the average of the selected intersignal times of those occurring before and after the measurement command signal provides a value of the fraction of one-half a fringe change which changes during the interpolation time.

A third technique includes utilizing the intersignal times for describing the characteristic behavior of the interference fringe pattern. This may be accomplished, since each intersignal time corresponds to a known fringe change. By way of an example, a least squares fit technique can be applied to the intersignal times so as to generate a characteristic polynomial function of time. By knowing the interpolation time, the fringe change may be determined by simple mathematics utilizing the characteristic function. This is so since the first derivative of the characteristic function represents the rate of change of the fringe change per unit of time which can then be multiplied by the interpolation time to determine the fringe change during the interpolation time.

A fourth technique may be utilized in the specialized situation where the interference fringe pattern varies by substantially a known characteristic function, the intersignal times may be then used to generate coefficients of the known characteristic function by generating a set of simultaneous equations in a well known manner. For example, the resultant interference fringe pattern of mechanically oscillated sensors varies in a sinusoidal function. In this situation, computer 430 may assume a sinusoidal function and determine coefficients thereof dependent upon the observed intersignal times so as to establish one or more coefficients thereof. By knowing the interpolation time and the characteristic function including coefficients, the interpolated fringe change occurring during the interpolation time may be determined.

The embodiment illustrated in FIG. 4 is such that computer 430 includes an arithmetic processing unit and appropriate memory for calculating the interpolated fringe change during the interpolation time by at least one of the four techniques as described above. Computer 430, appropriately programmed, functions as an approximating means for determining the characteristic function or coefficients thereof using data analysis techniques such as least squares fitting, which is well known in the art and is not described herein.

Now will be described a more detailed description of signal/data flow of the schematic block diagram of FIG. 4. Clock 416 provides clocking pulses to counter 417 for counting such pulses. In a situation where clock 416 is a 1 MHz clock, each count would then represent one microsecond of a continuous running clock. Counter 417 provides a 16 bit output data signal on signal line 418 which in turn is presented to data input terminals of RAM 410 and register 420.

The operation of the sequencing of RAM 410 will now be described. The output pulse on line 341 through write logic block 405 causes the contents of counter 417 to be written into a RAM 410 location determined by the address, ADR, on line 431. At the same time, the output pulse on line 341 interrupts computer 430 and causes it to step the address line ADDRESS to its next state. Of course, the address line does not step until data has been stored in the previous address. The above process continues for each signal pulse on line 341.

Upon a measurement command pulse on line 426, (i) register 420 is enabled to read the contents of counter 417; and (ii) provides an interrupt signal for computer 430 at interrupt input 401. The computer, having acknowledged the interrupt from signal line 426, permits only a limited number of "writes" into RAM 410 following the pulse on signal line 426. After all of the "writes" have been completed, a known number of data points both preceding and following the measurement command signal on signal line 426 now exist in RAM. At this point in time, computer 430 provides a control signal on signal line 432 to prevent signal pulses on line 341 to cause further writing into RAM 410 via write logic block 405, and at the same time enable reading of data at addressed RAM location. Having disabled write logic block 405, computer 430 sequences the RAM addresses on signal line 431 to read the data at those addresses in a predetermined manner depending upon the selected one of the aforesaid time interpolation techniques. After reading the data in RAM 410, signal line 432 can again be changed to allow writing into RAM.

As indicated earlier, address signal line 431 is also connected to register 420 and counter 450 which each have a predetermined address. Therefore, in the data sequencing operation of computer 430, the contents of register 420 and counter 45 will also be fed into the data input terminals of computer 430, the contents thereof indicating the real time at which the measurement command signal was initiated, and the total integral pulses since the last measurement command signal, respectively.

Computer 430, upon acknowledgement of a measurement command signal at input 401, provides the following functions in accordance with a stored program and program control. First, by keeping track of the addresses, computer 430 can compute intersignal times corresponding to each of the occurring fringe change pulses from detector means 400. Secondly, computer 430 can determine the interpolation time by determining the time difference between the values stored in the last address immediately preceding the measurement command signal and the contents of register 420. Third, computer 430 can compute the intersignal time between the preceding input pulse before the measurement command signal and the input pulse following the same command signal. Further, a plurality of intersignal times may also be determined following a measurement command signal depending upon the technique which is implemented by a stored program in computer 430 for determining the interpolated fringe change during the interpolation time. Therefore, once computer 430 contains sufficient intersignal times and the interpolation time, an arithmetic process, in accordance with a stored program for implementing one of the time interpolation techniques described above, may be then initiated for determination of the interpolated fringe change as well as determining algebraically the total fringe change including the count contained in register 450.

It should be understood that various changes and modifications of the embodiment shown in FIG. 4 and described herein will be apparent to those skilled in the art. Such changes and modifications can be made without departing from the spirit and scope of the present invention and without diminishing its advantages.

It should be noted that the circuit blocks of the embodiment of the invention shown in FIG. 4 with the exception of detector means 400 and the measurement command signal block 425 are common functions and/or components of microprocessor systems well known in the art. As is well known, microprocessor systems include an arithmetic unit, memory, as well as many other control functions, well known, for sequencing data between a memory and the arithmetic unit. Further, microprocessor systems (and computers) are usually provided with interrupt input terminals for interrupt functions like those described above. The write logic block 405 is a logic circuit specifically dependent upon the type of microprocessor/computer 430 selected as well as the selection of RAM 410. Thus, there are a variety of ways to arrange the components and/or functions of the circuit blocks shown in FIG. 4 as well as data control flow signals (not shown) and are intended to be within the scope of the present invention.

For those skilled in the art of ring laser angular rate sensors, it should be noted that the high resolution fringe pattern interpolator as just described may be directly applicable to one or the other of the counterpropagating waves of the counterpropagating laser beams of the sensor which exhibit a frequency characteristic substantially identical to the varying interference fringe pattern variation frequency. U.S. Pat. No. 4,152,071 by Podgorski, and assigned to the assignee of the present application teaches that each of the counterpropagating waves is amplitude modulated by the beat frequency, namely the frequency difference between the counterpropagating waves. It is well known that the interference fringe pattern normally provided as an output has the same frequency behavior as the amplitude modulation since they both cyclically vary at the same beat frequency. Therefore, photodetector 300 may be arranged in a manner as shown in FIG. 7 of the above referred to patent so as to provide an output signal indicative of the intensity variations at the beat frequency. Thus, the embodiment of the invention shown in FIG. 4 may be utilized to count the cyclical variations of the amplitude modulated laser beams at the beat frequency which is directly proportional to the rate of rotation of the sensor.

However, in the above situation the beam modulation is directly related to the phase change between the counterpropagating laser beams of the sensor. It should be understood that one cycle of beam modulation is equivalent to one complete fringe change of an interference pattern, and they both correspond to a $2\pi$ phase change between the two laser beams or waves.

It should be noted that in either case, filter-amplifier 310 is selected so as to be responsive to the beat frequency range of the sensor under normal operating inertial inputs. It should be also understood that the selection of components for detector 300, filter-amplifier 310 and comparator 320 should be a variety which provides minimum noise, particularly in angular rate sensor systems, and especially when being responsive to the amplitude modulation of one or the other of the laser beams. This is so since the amplitude modulated portion of the intensity of the laser beam is substantially less than that of the average intensity. This is not the case in the situation when photodetector 300 is responsive to the interference fringe pattern since it must only respond to light and dark intensities.

The embodiments of the invention in which an exclusive property or right is claimed are defined as follows:

1. An apparatus for counting fringe changes of a varying interference fringe pattern comprising:
   detector means responsive to said varying interference fringe pattern capable of providing a selected signal for each occurrence of a selected fringe change of said varying interference fringe pattern;
   timing means responsive to said selected signal having,
      first means for determining an interpolation time where said interpolation time is the elapsed time between an occurrence of a measurement command signal and an immediately preceding occurrence of said selected signal, and
      second means capable of determining at least a first intersignal time, said intersignal time being the elasped time between two selected occurrences of said selected signal; and
   interpolation means responsive to said interpolation time and said at least a first intersignal time for providing an output signal representative of an interpolated fringe change, said interpolated fringe change being the fringe change of said varying interference fringe pattern occurring during said interpolation time.

2. The apparatus of claim 1 wherein:
   said at least a first intersignal time is the elapsed time between said immediately preceding occurrence of said selected signal and an occurrence of said selected signal immediately following said measurement command signal; and
   said interpolation means includes means for determining a ratio of said interpolation time and said at least a first intersignal time, said interpolated fringe change being a function of said ratio.

3. The apparatus of claim 1 wherein:
   said second means is further capable of determining a plurality of intersignal times, including said at least a first intersignal time, corresponding to selected pairs of two occurrences of said selected signal; and
   said interpolation means includes,
      approximating means responsive to said plurality of intersignal times for determining a characteristic function which is characteristic of the behavior of said varying interference fringe pattern, and
      means responsive to said characteristic function and said interpolation time for determining said interpolated fringe change.

4. The apparatus of claim 3 wherein said approximating means includes means for determining said characteristic function as a polynomial function of time.

5. The apparatus of claim 3 wherein said approximating means includes means for determining coefficients of a predetermined characteristic function.

6. The apparatus of claim 1 wherein:
   said second means is further capable of determining a plurality of intersignal times, including said at least a first intersignal time, corresponding to selected pairs of two occurrences of said selected signal; and
   said interpolation means further includes,
      means for providing an average time value of selected ones of said plurality of intersignal times including those before and after said measurement command signal, and
      means for determining a ratio of said interpolation time and said average time value, said output signal representative of said interpolated fringe change being a function of said ratio.

7. The apparatus of claim 6 wherein said average time value includes at least one intersignal time before and one intersignal time after said measurement command signal.

8. The apparatus of claim 1 wherein said timing means further comprises:
   clock means for providing a time output signal representative of clock times of a running clock, said time output signal being presented to said first and second means for responding thereto;
   said first means further includes a data storage means for storing a corresponding one of said clock times at said occurrence of said measurement command signal; and
   said second means further includes a data storage means for storing selected ones of said clock times corresponding to occurrences of said selected signal.

9. The apparatus of claim 8 wherein said interpolation means is provided, at least in part, by a microprocessor.

10. A readout apparatus for a ring laser angular rate sensor in which two laser beams counterpropagate therein, wherein a portion of said two laser beams are emitted as an output to produce a continuously varying interference fringe pattern, the apparatus comprising:
    detector means responsive to said varying interference fringe pattern capable of providing a selected signal for each occurrence of a selected fringe change of said varying interference fringe pattern;
    timing means responsive to said selected signal having,
       first means for determining an interpolation time where said interpolation time is the elapsed time between an occurrence of a measurement command signal and an immediately preceding occurrence of said selected signal, and
       second means capable of determining at least a first intersignal time, said intersignal time being the elapsed time between two selected occurrences of said selected signal; and
    interpolation means responsive to said interpolation time and said at least a first intersignal time for providing an output signal representative of an interpolated fringe change, said interpolated fringe change being the fringe change of said varying interference fringe pattern occurring during said interpolation time.

11. The apparatus of claim 10 wherein said timing means further comprises:
    clock means for providing a time output signal representative of clock times of a running clock, said time output signal being presented to said first and second means for responding thereto;
    said first means further includes a data storage means for storing a corresponding one of said clock times at said occurrence of said measurement command signal; and
    said second means further includes a data storage means for storing selected ones of said clock times corresponding to occurrences of said selected signal.

12. The apparatus of claim 10 wherein:

said at least a first intersignal time is the elapsed time between said immediately preceding occurrence of said selected signal and an occurrence of said selected signal immediately following said measurement command signal; and said interpolation means includes means for determining a ratio of said interpolation time and said at least a first intersignal time, said interpolated fringe change being a function of said ratio.

13. The apparatus of claim 10 wherein said fringe change is indicative of the phase change between said two laser beams.

14. A readout apparatus for a ring laser angular rate sensor in which two laser beams counterpropagate therein, wherein a portion of one of said laser beams is emitted as an output, the apparatus comprising:

detector means responsive to one of said laser beams capable of providing a selected signal for each occurrence of a selected phase change between said waves;

timing means responsive to said selected signal having, first means for determining an interpolation time where said interpolation time is the elapsed time between an occurrence of a measurement command signal and an immediately preceding occurrence of said selected signal, and second means capable of determining at least a first intersignal time, said intersignal time being the elapsed time between two selected occurrences of said selected signal; and interpolation means responsive to said interpolation time and said at least a first intersignal time for providing an output signal representative of an interpolated phase change, said interpolated phase change being the phase change between said laser beams occurring during said interpolation time.

15. The apparatus of claim 14 wherein said timing means further comprises:

clock means for providing a time output signal representative of clock times of a running clock, said time output signal being presented to said first and second means for responding thereto;

said first means further includes a data storage means for storing a corresponding one of said clock times at said occurrence of said measurement command signal; and said second means further includes a data storage means for storing selected ones of said clock times corresponding to occurrences of said selected signal.

16. The apparatus of claim 14 wherein:

said at least a first intersignal time is the elapsed time between said immediately preceding occurrence of said selected signal and an occurrence of said selected signal immediately following said measurement command signal; and said interpolation means includes means for determining a ratio of said interpolation time and said at least a first intersignal time, said interpolated phase change being a function of said ratio.

* * * * *